United States Patent
Ito et al.

(10) Patent No.: US 8,523,153 B2
(45) Date of Patent: Sep. 3, 2013

(54) SPRING

(75) Inventors: Hidemasa Ito, Yokohama (JP); Norihiro Tajima, Yokohama (JP)

(73) Assignee: NHK Spring Co., Ltd., Yokohama (JP)

( * ) Notice: Subject to any disclaimer, the term of this patent is extended or adjusted under 35 U.S.C. 154(b) by 8 days.

(21) Appl. No.: 13/141,421

(22) PCT Filed: Dec. 10, 2009

(86) PCT No.: PCT/JP2009/070678
§ 371 (c)(1),
(2), (4) Date: Jun. 22, 2011

(87) PCT Pub. No.: WO2010/073918
PCT Pub. Date: Jul. 1, 2010

(65) Prior Publication Data
US 2011/0254210 A1   Oct. 20, 2011

(30) Foreign Application Priority Data
Dec. 22, 2008   (JP) ................................ 2008-326131

(51) Int. Cl.
*F16F 1/34*   (2006.01)

(52) U.S. Cl.
USPC ........................................................ 267/161

(58) Field of Classification Search
USPC ..................... 267/136, 139, 140.13, 158, 161
See application file for complete search history.

(56) References Cited

U.S. PATENT DOCUMENTS
3,563,527 A * 2/1971 Tillman ........................ 267/181

FOREIGN PATENT DOCUMENTS

| | | |
|---|---|---|
| JP | A-2-8523 | 1/1990 |
| JP | A-5-172171 | 7/1993 |
| JP | U-6-76728 | 10/1994 |
| JP | A-2002-54685 | 2/2002 |
| JP | A-2009-275738 | 11/2009 |
| WO | WO 2009/139332 A1 | 11/2009 |

OTHER PUBLICATIONS

International Search Report dated Jan. 12, 2010 in corresponding International Application No. PCT/JP2009/070678.

* cited by examiner

*Primary Examiner* — Robert A Siconolfi
*Assistant Examiner* — Vu Q Nguyen
(74) *Attorney, Agent, or Firm* — Oliff & Berridge, PLC (57) ABSTRACT

A spring, provided between a first member and a second member, includes a main body portion having a hole portion; a cylindrical portion provided at the radially inner circumference and the radially outer circumference of the main body portion; and a corner portion formed at a boundary portion between the main body portion and the cylindrical portion; in which the main body portion is extended to a crossing direction with respect to a direction along suppress strength provided from the first member and the second member, the cylindrical portion has an abutting portion protruding from each circumference of the main body portion toward one of the first member and the second member and abutting thereat, the corner portions can be elastically deformed while varying angles thereof according to the suppression strength, and the corner portion defines a tangent line along the main body portion, and at least one of tangent lines of the corner portions makes a predetermined angle with respect to a straight line between the radially inner circumference and the radially outer circumference of the main body portion.

2 Claims, 5 Drawing Sheets

SPRING

BACKGROUND OF THE INVENTION

1. Field of the Invention

The present invention relates to a spring that is provided between a first member and a second member for inhibiting transmission of high-frequency vibration therebetween, and in particular relates to an improvement in a shape of the spring.

2. Related Art

In a variety of fields of such as automobiles, precision equipment, home electrical appliances and architectural industries, techniques for inhibiting transmission of vibrations are required. The techniques for inhibiting transmission of vibrations are applied to engines, motors rotating at high speed, dewatering bins of laundry machines and constructions, etc. As a technique for inhibiting transmission of vibration, a natural vibration frequency of a system composed of an object and a supporting portion is set at a sufficiently lower degree than a predetermined vibration frequency range. As a method for this setting, a constant of a spring in the supporting portion may be reduced. In this case, when the constant of the spring is reduced, the size of the spring must be increased for supporting a load thereat.

Figure 6:
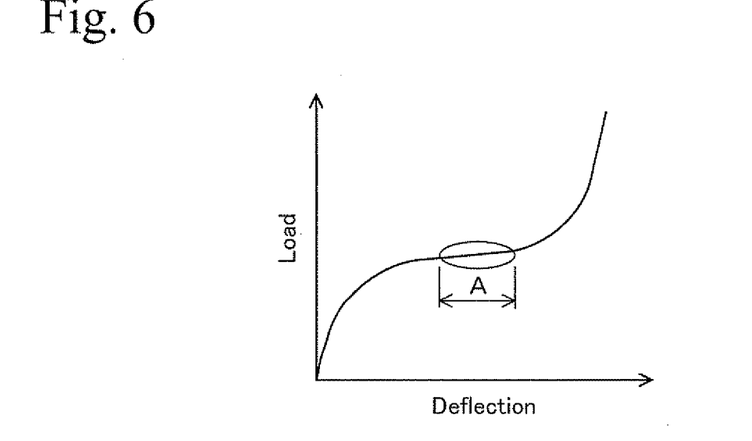
FIG. 6 is a graph showing a loading characteristic of the disc spring.

A method in which a disc spring is used between the object and the supporting portion is proposed (For example, see Japanese Patent Applications, First Publication No. 5-172171 and First Publication No. 2002-54685.). Loading characteristics of a disc spring are designed as a curve shown in FIG. 6, so that not only can the load be supported, but also an area A can be set on the curve, and the constant of the spring can be reduced when the loading characteristics thereof are within the area A.

Figure 7A:
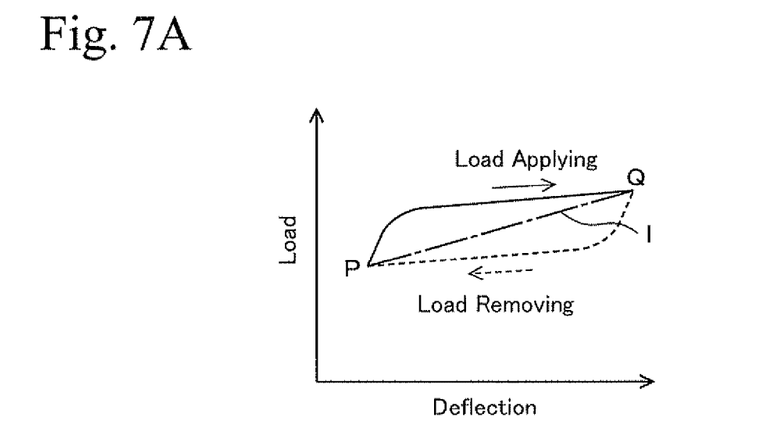
FIG. 7A is a graph in a condition in which the fluctuation of a range of use is a predetermined degree.
Figure 7B:
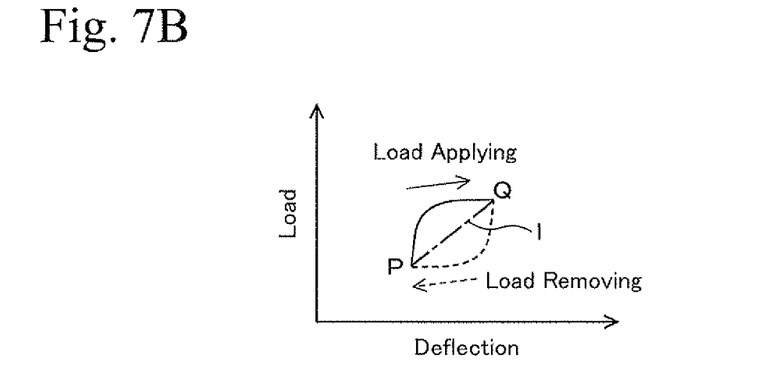
FIG. 7B is a graph in a condition in which the fluctuation in a range of use is less than in the case of the graph in FIG. 7A.

When a disc spring is deformed in a substantially flat shape by an applied load, edge portions of an inner circumference and an outer circumference thereof slide with respect to counter members, whereby friction occurs. Therefore, when a range of use of the disc spring is set within the area A shown in FIG. 6, hysteresis shown in FIG. 7A occurs on the practical loading curve. As a result, the practical dynamic constant of the disc spring in the range of use thereof is determined according to an inclination of a diagonal line between points P and Q in FIG. 7. In this case, when a fluctuation of in the range of use is set at a small degree, as shown in FIG. 7B, the inclination of the diagonal line is increased, so that the dynamic constant of spring is increased. In a system in which such a disc spring is used, when a fine vibration such as a high-frequency vibration is provided, the dynamic constant of the spring is increased, so that the natural vibration frequency of the system is increased. As a result, transmission of the high-frequency vibrations cannot be inhibited.

SUMMARY OF THE INVENTION

Figure 8A:
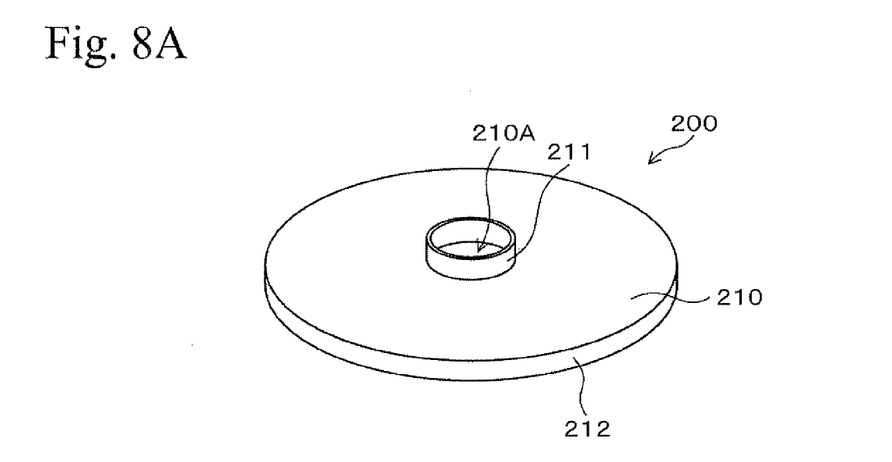
FIG. 8A is a schematic view of the structure and FIG. 8B is a cross-sectional side view showing a right hand portion thereof.
Figure 8B:
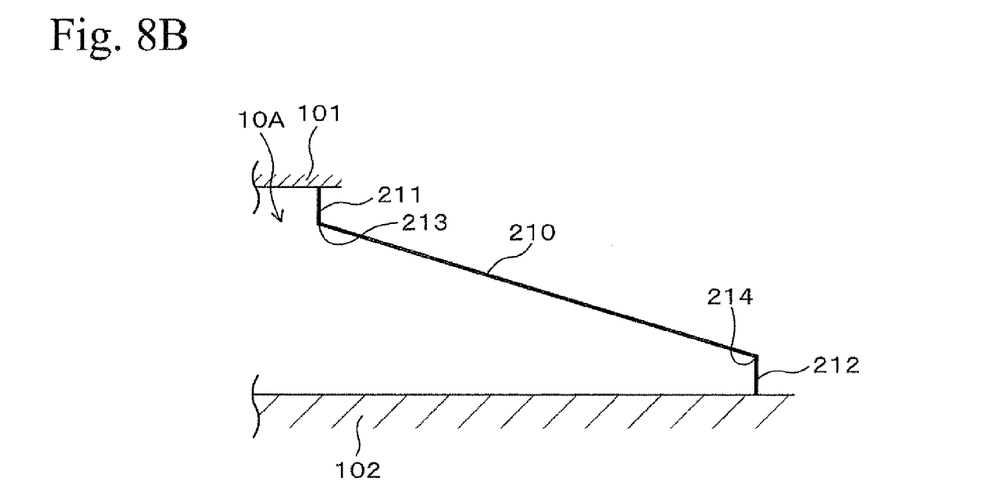

For solving a problem described above, a spring 200 shown in FIGS. 8A and 8B is proposed by the present applicant (the spring 200 is not disclosed yet). FIGS. 8A and 8B are views showing structures of the spring 200, FIG. 8A is a schematic view and FIG. 8B is a cross-sectional side view showing a right hand portion thereof. FIG. 8B is a view showing a condition in which the spring 200 is disposed between a first member 101 and a second member 102. The spring 200 is provided with a main body portion 210 in which a hole portion 210A is formed at a radial center thereof.

At a radially inner circumference of the main body portion 210, a first cylindrical portion 211 protruding toward the first member 101 is provided and a second cylindrical portion 212 protruding toward the second member 102 is provided at a radially outer circumference of the main body portion 210. A first corner portion 213 is formed at a boundary portion between the main body portion 210 and the first cylindrical portion 211 and a second corner portion 214 is formed at a boundary portion between the main body portion 210 and the second cylindrical portion 212. In the spring 200, the corner portions 213 and 214 can be elastically deformed in allied load while varying angles thereof according to suppression strength provided from the counter members 101 and 102, so that the cylindrical portions 211 and 212 can be prevented from sliding with respect to the counter members 101 and 102.

Figure 9:
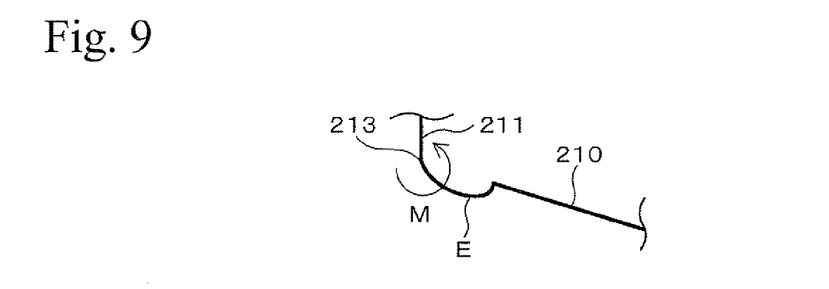
FIG. 9 is a cross-sectional side view showing a portion in a condition in which local deformation thereof occurred by a bending moment in the spring of the comparative example.

However, in the spring 200, rigidities of the cylindrical members 211 and 212 are greater than those of other portions, so that deformation of the main body portion 210 in applying loads is restricted. Therefore, great stress occurs in the corner portions 213 and 214, as shown in FIG. 9, so that portions E of the main body portion 210 in the vicinities of the corner portions 213 and 214 are locally and highly deformed by a bending moment M occurred therein. As a result, actually generated stress may be less than designed stress. Only the corner portion 213 and the portion E in the vicinity thereof are show in FIG. 9.

Therefore, an object of the present invention is to provide a spring in which not only can hysteresis in loading characteristics be prevented from occurring, but also actually generated loads can be increased.

The spring of the present invention is a spring provided between a first member and a second member and includes a main body portion having a hole portion; a cylindrical portion provided at a radially inner circumference and a radially outer circumference of the main body portion; and a corner portion formed at a boundary portion between the main body portion and the cylindrical portion; in which the main body portion is extended to a crossing direction with respect to a direction along suppress strength provided from the first member and the second member, the cylindrical portion has a abutting portion protruding from each circumference of the main body portion toward one of the first member and the second member and abutting thereat, the corner portions can be elastically deformed while varying angles thereof according to the suppress strength, and the corner portion defines a tangent line along the main body portion, and at least one of tangent lines of the corner portions makes a predetermined angle with respect to a straight line between the radially inner circumference and the radially outer circumference of the main body portion. "Cross-sectional shape" in the present application is side cross-sectional shape in a parallel direction with respect to an axial direction of the cylindrical portion and is called "cross-sectional shape" hereinafter.

In the spring of the present invention, when loads provided from counter members (the first member and the second member) are compressive loads, the corner portions defined a tangent line along the main body portion and the tangent lines are positioned at a clockwise direction side with respect to a straight line between the radially inner circumference and the radially outer circumference of the main body portion.

In the spring of the present invention, the corner portion can be elastically deformed in applying load, so that deformation in applying a load of a portion of the cylindrical portion in the vicinity of the counter member can be prevented by appropriately setting a distance between the corner portion and the counter member via the cylindrical portion. Therefore, the cylindrical portion can be prevented from sliding with respect to the counter member, so that friction does not occur therebetween. As a result, hysteresis of the loading characteristic of the spring can be prevented from occurring.

In the spring of the present invention, at least one of the tangent lines makes the predetermined angle with respect to the straight line between the radially inner circumference and the radially outer circumference of the main body portion. By this structure, in the spring of the present invention, a perpendicular component (the component in the perpendicular direction with respect to the tangent line) of the load in the corner portion is reduced compared to the perpendicular component (the component in the perpendicular direction with respect to the straight line between the radially inner circumference and the radially outer circumference of the main body portion) of the load of a spring of a comparative example, in which the radially inner circumference and the radially outer circumference of the main body portion are connected by a linear-shaped portion. Therefore, the bending moment occurring in the corner portion can be reduced, so that local deformation of the portion of the main body portion in the vicinity of the corner portion can be inhibited. As a result, actually generated stress may be less than designed stress.

The spring of the present invention can be used with various structures. For example, a cross-sectional surface of the main body portion can be used with various shapes. For example, the shape of the cross-sectional surface of the main body portion can contain at least one S-shaped cross section. In this aspect, effects described above can be obtained in an improved condition. Furthermore, the shape of the cross-sectional surface of the main body portion may contain a linear shape.

According to the spring of the present invention, not only can the hysteresis of the loading characteristic be prevented from occurring but also the stress occurring in the corner portion can be reduced, so that local deformation of the portion of the main body portion in the vicinity of the corner portion can be inhibited. As a result, actually generated stress may be less than designed stress.

BRIEF DESCRIPTION OF DRAWINGS

FIGS. 1A and 1B are views showing structures of a spring in accordance with an embodiment of the present invention, in which

FIGS. 2A and 2B are views showing operating conditions of the right hand portion of the spring, in which

FIGS. 7A and 7B are graphs showing the practical loading characteristics of the disc spring in which hysteresis is occurring, in which

FIGS. 8A and 8B are views showing structures of the spring of a comparative example, in which

DESCRIPTION OF PREFERRED EMBODIMENTS

Figure 1A:
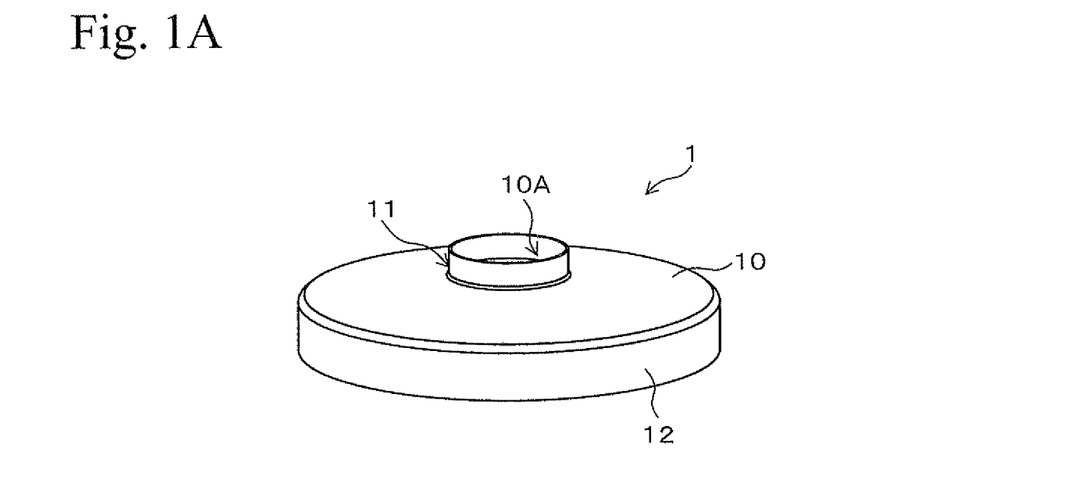
FIG. 1A is a schematic view of the structure and FIG. 1B is a cross-sectional side view showing a right hand portion of the structure of the spring.
Figure 1B:
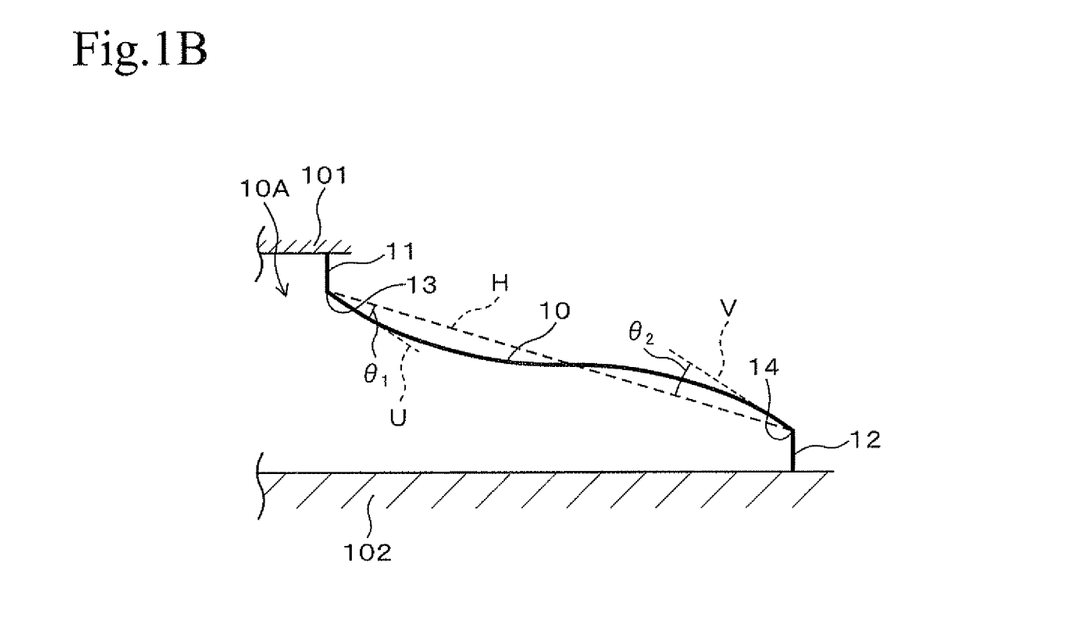

An embodiment of the present invention is explained hereinafter with reference to the Figures. FIGS. 1A and 1B are views showing structures of a spring 1 in accordance with an embodiment of the present invention; FIG. 1A is a schematic view of the structure and FIG. 1B is a cross-sectional view showing a right hand portion of the structure of the spring 1. FIG. 1B is a view showing a condition in which the spring 1 is disposed between a first member 101 and a second member 102. In FIG. 1B, reference symbol H is a straight line between the radially inner circumference and the radially outer circumference of a main body portion 10, reference symbol U is a tangent line which is defined along the main body portion 10 by a first corner portion 13 and reference symbol V is a tangent line which is defined along the main body portion 10 by a second corner portion 14. The spring 1 is applied, for example, when a load from a counter member (the first member 101 or the second member 102) is a compressing load.

The spring 1 is provided with, for example, the main body portion 10 in which a hole portion 10A is formed at the radial center thereof. The main body portion 10 which is extended toward a crossing direction with respect to a direction of suppress strength provided from, for example, the first member 101 and the second member 102 has a function as a disc spring.

The hole portion 10A has, for example, a circular shape. A first cylindrical portion 11 protruding toward the first member 101 is provided at a radially inner circumference of the main body portion 10. An upper end portion of the first cylindrical portion 11 is an abutting portion abutting at the first member 101. A second cylindrical portion 12 protruding toward the second member 102 is provided at a radially outer circumference of the main body portion 10. A lower end portion of the second cylindrical portion 12 is an abutting portion abutting at the second member 102.

Figure 2A:
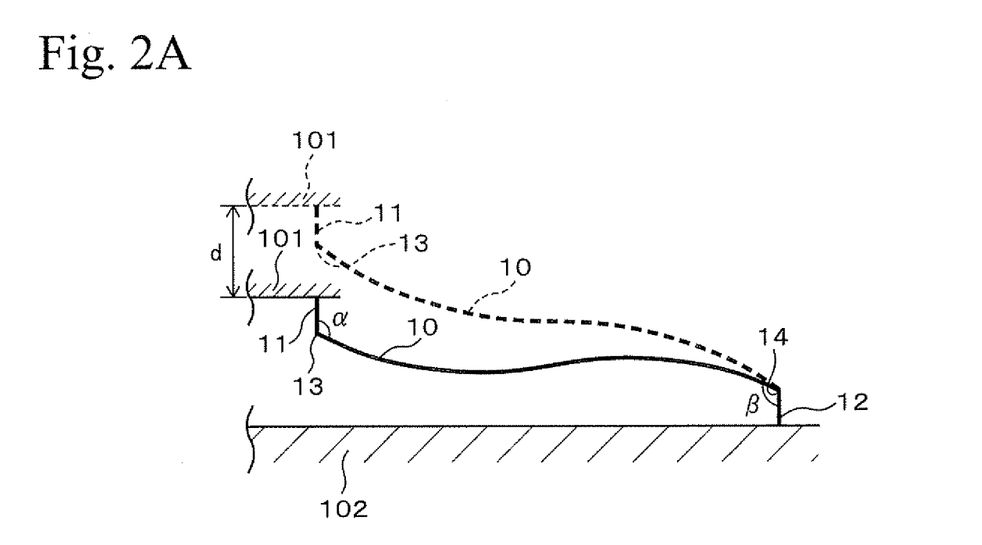
FIG. 2A is a cross-sectional side view showing the structures before the operation (shown by a dashed line) and in the operation (shown by a solid line) of the spring.
Figure 2B:
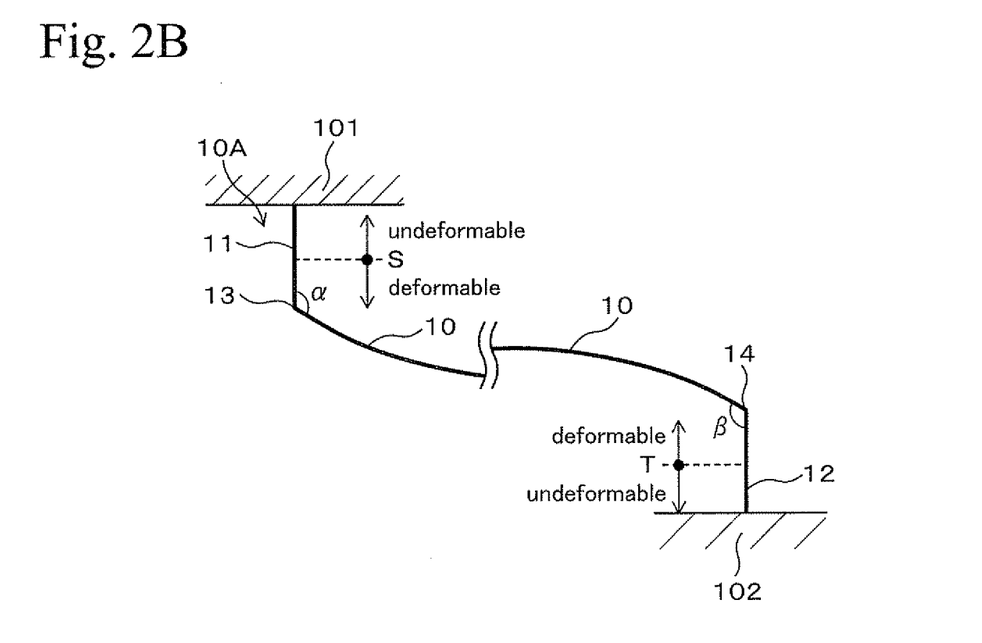
FIG. 2B is an enlarged cross-sectional side view showing a first corner portion and a second corner portion in the operation of the spring.

A first corner portion 13 is formed at a boundary portion between the main body portion 10 and the first cylindrical portion 11, and a second corner portion 14 is formed at a boundary portion between the main body portion 10 and the second cylindrical portion 12. The first corner portion 13 and the second corner portion 14 can be elastically deformed while varying angles thereof (the angles α and β in FIG. 2) according to the suppression strength provided from the first member 101 and the second member 102. The first corner portion 13 and the second corner portion 14 can be formed by various methods. The first corner portion 13 and the second corner portion 14 can be formed by, for example, the method in which the boundary portions between the main body portion 10 and the first cylindrical member 11 and the second cylindrical member 12 are bent. Furthermore, for example, the corner portions can be formed by welding between the main body portion 10 and the first cylindrical member 11 and between the main body portion 10 and the second cylindrical member 12.

A cross-sectional surface of the main body portion 10 has, for example, an S-shaped cross section containing the cross-sectional shapes of a first corner portion 13 side and the second corner portion 14 side curved portions. In this case, the shape of the main body portion 10 is designed so as to satisfy the following conditions. As shown in FIG. 1B, the tangent line U of the first corner portion 13 makes a predetermined angle $\theta_1$ with respect to a straight line H between the radially inner circumference and the radially outer circumference of the main body portion 10 and is positioned at a clockwise direction side with respect to the straight line H. The tangent line V of the second corner portion 14 makes a predetermined angle $\theta_2$ with respect to the straight line H between the radially inner circumference and the radially outer circumference of the main body portion 10 and is positioned at the clockwise direction side with respect to the straight line H. At the main body portion 10 sides of the first corner portion 13 and the second corner portion 14, a curved portion (not shown) that is necessary in producing the spring and has about one to two times the size of a board thickness thereof is formed in addition to the S-shaping curved portion.

Functions of the first cylindrical member 11 and the second cylindrical portion 12 in applying a load are explained with principal reference to FIGS. 2A and 2B. FIGS. 2A and 2B are views showing operating conditions of the spring 1, FIG. 2A is the cross-sectional view showing the structures before the operation (shown by a dashed line) and in the operation (shown by a solid line) of the spring 1, and FIG. 2B is the enlarged cross-sectional view showing the first corner portion 13 and the second corner portion 14 in the operation of the spring 1. In FIG. 2B, only the right hand portion of the spring 1 is shown in the same way as in FIG. 1B.

As shown by the dashed line in FIG. 2A, the spring 1 disposed between the first member 101 and the second member 102 is loaded in the downward direction from the first member 101. By this loading, as shown by the solid line in FIG. 2B, the spring 1 is deflected, so that the first member 101 is downwardly moved. Reference symbol d in FIG. 2A is a degree of the deflection of the spring 1.

The main body portion 10 is extended toward the crossing direction with respect to the direction of suppression strength provided from the first member 101 and, at the upper side of the spring 1, the first cylindrical portion 11 protrudes from the radially inner circumference of the main body portion 10 toward the first member 101 and is abutted thereat. The first corner portion 13 formed at the boundary portion between the main body portion 10 and first cylindrical member 11 can be elastically deformed in applying a load while varying the angle θ1 according to suppression strength provided from the first member 101. In this case, the first corner portion 13 is a portion formed at the position between the main body portion 10 and the first cylindrical portion 11 in the above positioning relationship, so that such a first corner portion 13 can be moved toward the inside of the radially inner circumference of the main body portion 10 (the left hand direction in the Figs.) in applying a load while varying an angle α.

The first corner portion 13 can be elastically deformed in applying a load, so that the first member 101 side portion of the first cylindrical portion 11 can be prevented from deformation by appropriately setting an axial length of the first cylindrical portion 11 in applying a load so that an undeformabie portion (the upper side portion from the point of reference symbol S in FIG. 2B) can be formed at the first member 101 side of the first cylindrical portion 11.

On the other hand, at the lower side of the spring 1, the second cylindrical portion 12 protrudes from the radially outer circumference of the main body portion 10 toward the second member 102 and is abutted thereat. In this case, the second corner portion 14 having the same function as the first corner portion 13 can be moved toward the outside of the radially outer circumference of the main body portion 10 (the right hand direction in the Figs.) in the elastic deformation thereof by applying a load while varying an angle β according to suppression strength provided from the second member 102.

As explained in the above, the second corner portion 14 can be elastically deformed in applying a load, so that the second member 102 side portion of the second cylindrical portion 12 can be prevented from deformation by appropriately setting the axial length of the second cylindrical portion 12 in applying a load so that an undeformable portion (the lower side portion from the point of reference symbol T in FIG. 2B) can be formed at the second member 102 side of the second cylindrical portion 12.

As explained above, the spring 1 includes the undeformable portions at the cylindrical portions 11 and 12, whereby sliding between the spring 1 and the counter member can be prevented. As a result, in the loading characteristic of the spring 1, hysteresis, which is a problem to be solved for the disc spring, does not occur.

Figure 3:
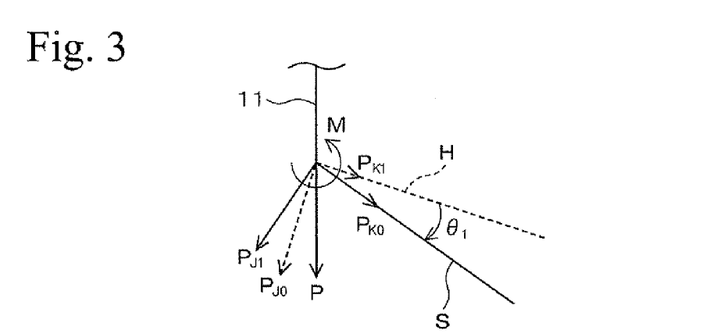
FIG. 3 is a diagram for an explanation of each loading component acting in applying load to the first corner portion in FIG. 2B.

Deforming conditions in applying a load of the corner portions 13 and 14 having these structures of the spring 1 are explained with principle reference to FIG. 3. FIG. 3 is a diagram for an explanation of each loading component acting on the first corner portion 13 in FIG. 2B in applying a load. The deforming condition in applying a load of the second corner portion 14 is the same as that of the corner portion 13, so that the explanation thereof is omitted. Reference symbol P is the load from the first member 101 through the first cylindrical portion 11.

Reference symbol $P_{J1}$ is a perpendicular component (the perpendicularly loading component with respect to the tangent U) of the load acting on the spring of an example of the present invention and reference symbol $P_{K1}$ is a parallel component (the parallel loading component with respect to the tangent U) of the load acting on the spring of the example of the present invention. The spring of the example of the present invention includes a main body portion 10 of the present embodiment having a cross-sectional shape in which the tangent line U of the curved portion of the first corner portion 13 makes a predetermined angle $\theta_1$ with respect to the straight line H between the radially inner circumference and the radially outer circumference of the main body portion 10.

A spring of a comparative example (the spring 200 in FIGS. 8A and 8B) is provided with a main body portion having the same cross-sectional shape as the straight line H between the radially inner circumference and the radially outer circumference of the main body portion 10 and shapes of other portions thereof except for the main body portion are the same as those of the spring of the example of the present invention. Reference symbol $P_{J0}$ is a perpendicular component (the perpendicularly loading component with respect to the straight line H) of the load acting on the spring of the comparative example and reference symbol $P_{k0}$ is a parallel component (the parallel loading component with respect to the straight line H) of the load acting on the spring of the comparative example.

When the load is applied, as explained in the above, in the spring of the example of the present invention, a perpendicular component of the load P is indicated by reference symbol $P_{J1}$ and, in the spring of the comparative example, the perpendicular component of the load P is reference symbol $P_{J0}$. In this condition of the spring of the example of the present invention, the tangent line U of the first corner portion 13 makes the angle $\theta_1$ with respect to the straight line H between the radially inner circumference and the radially outer circumference of the main body portion 10. By this structure, in the spring of the example of the present invention, the perpendicular component $P_{J1}$ of the load in the first corner portion 13 can be reduced compared to the perpendicular component $P_{J0}$ of the load in the spring of the comparative example, in which the radially inner circumference and the radially outer circumference of the main body portion are connected by the linear-shaped portion. Therefore, the bending moment occurring toward the counterclockwise direction in the first corner portion 13 can be reduced, so that the stress occurring therein can also be reduced. As a result, local deformation of the portion of the main body portion 10 in the vicinity of the first corner portion 13 can be inhibited, so that the amount of the generated load can be increased.

Figure 4:
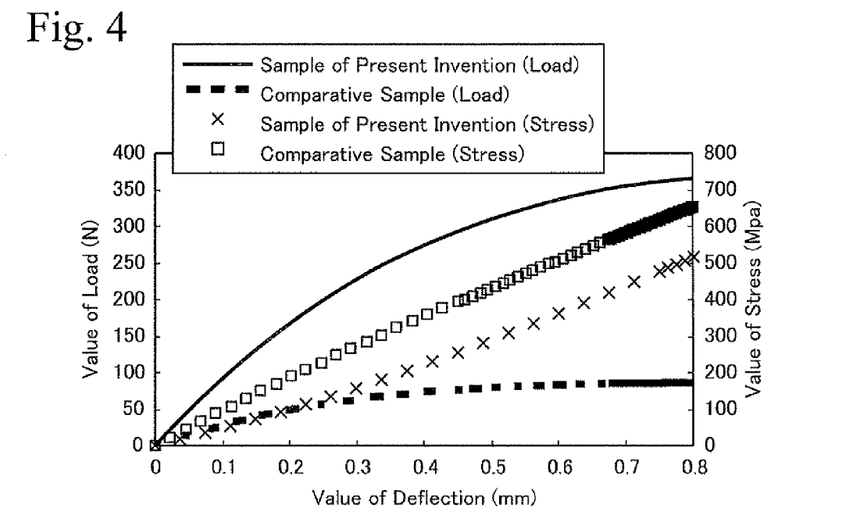
FIG. 4 is a graph showing simulation outcomes of stresses and the loads occurring in the first corner portions of an example of the present invention and a comparative example.

FIG. 4 is a graph showing simulation outcomes of the stresses and the loads occurring in the first corner portions 13 of the springs of the example of the present invention and the comparative example (conventional example). In the simulation, board thicknesses of both springs of the example of the present invention and the comparative example were set at 0.4 mm and both inner diameters of the first cylindrical portions thereof were set at 13 mm. Furthermore, both inner diameters of the second corner portions thereof were set at 50 mm and a bending radius of the spring of the example of the present invention was set at 40 mm. In a case in which the board thickness of the spring is set at 0.4 mm, the curved portions that are necessary in production and have about one to two times the size (0.4 to 0.8 mm) of the board thickness are formed at the main body portion 10 sides of the first corner portion 13 and the second corner portion 14.

According to FIG. 4, in the spring of the example of the present invention, not only can the stress occurring in the corner portion be reduced, but also the amount of the generated load can be increased compared to those of the spring of the comparative example.

As explained above, in the spring 1 of the embodiment of the present invention, not only can the hysteresis in the loading characteristic be prevented from occurring, but also the stresses occurring in the corner portions 13 and 14 can be reduced, so that local deformations of the portions of the main body portion 10 in the vicinities the corner portions 13 and 14 can be inhibited. As a result, the amount of the generated load can be increased in a case in which actually generated stress is less than designed stress.

The present invention is explained with reference to an embodiment thereof. The present invention is not limited by this embodiment, and various modifications may be used. In the modifications, the same numerals are applied to the same components as in the above embodiment, and explanations of the same components are omitted.

Figure 5:
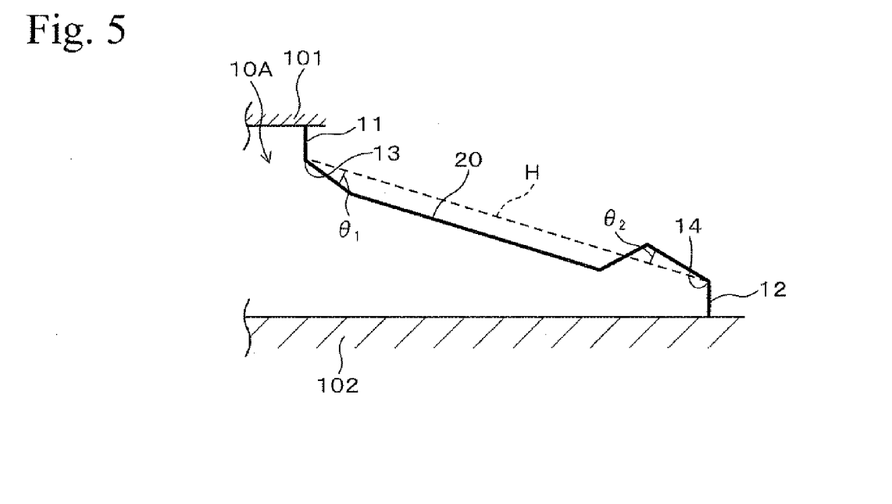
FIG. 5 is a view showing a structure of a modification of the spring in accordance with the embodiment of the present invention and is a cross-sectional view showing a right hand portion thereof.

In the embodiment, the main body portion 10 of the present invention has an S-shape, but the shape thereof is not limited to the S-shape. The cross-sectional surface of the main body portion 10 of the present invention may be designed in a shape in which the tangent lines U and V to the corner portions 13 and 14 make the predetermined angles with respect to the straight line H between the radially inner circumference and the radially outer circumference of the main body portion 10. Specifically, the main body portion 10 can be applied with variations of the curved surface shape and may contain plural curved surface shapes. Furthermore, the cross-sectional surface of the main body portion 10 may contain not only the curved shape but also the linear shape, and plural linear shapes in such as a main body portion 20 shown in FIG. 5 may be applied thereto. In this case, an angle $\theta_1$ is formed between a linear portion of the main body portion 20 side of a first corner portion 13 and a straight line H between the radially inner circumference and the radially outer circumference of the main body portion 20. An angle $\theta_2$ is formed between the linear portion of the main body portion 20 side of a second corner portion 14 and the straight line H between the radially inner circumference and the radially outer circumference of the main body portion 20.

In the embodiment, the first and the second cylindrical portions 11 and 12 are used as the cylindrical portions of the present invention. The cylindrical portions of the present invention are not limited by these structures and may be applied with variations of the structures. For example, when deflection of the spring is small, only one of the first and the second cylindrical portions can be used. Furthermore, the shape of the cylindrical portion is not limited by the cylindrical shape shown in the embodiment but may be applied with the variations of shapes such as a conical shape. In this case, a cross-sectional surface of the cylindrical portion is not limited by the linear shape but may be applied with the curved shape such as the S-shape.

Slits for saving weight can be formed at the main body and the cylindrical portions of the spring of the present invention. Furthermore, stoppers for fixing the first cylindrical portion 11 and the second cylindrical portion 12 can be formed at the first member 101 and the second member 102 at which the first cylindrical portion 11 and the second cylindrical portions 12 are abutted. The spring of the present invention can be applied to a variety of mechanisms such as a fastening mechanism and a variety of equipment such as antivibration equipment. Furthermore, the main body portion side curved portion of the corner portion of the spring of the present invention may be formed at only one of the corner portions 13 and 14.

Of course modifications explained above can be appropriately combined.

What is claimed is:

1. A spring provided between a first member and a second member, the spring comprising:
   a main body portion having a hole portion;
   a first cylindrical portion provided at a radially inner circumference and a second cylindrical portion provided at a radially outer circumference of the main body portion;
   a first corner portion formed at a boundary portion between the main body portion and the first cylindrical portion; and
   a second corner portion formed at a boundary portion between the main body portion and the second cylindrical portion;
   wherein the main body portion is extended in a crossing direction with respect to a direction in which the spring is compressed from the first member and the second member,
   the first and the second cylindrical portions have an abutting portion protruding from each circumference of the main body portion toward one of the first and the second members and abutting thereat,
   the first and the second corner portions can be elastically deformed while varying angles thereof according to a suppression strength,
   the first and the second corner portions define tangent lines along the main body portion, and at least one of the tangent lines has a predetermined angle with respect to a straight line between the radially inner circumference and the radially outer circumference of the main body portion, and
   a cross-sectional surface of the main body portion contains at least one S-shaped cross section, the cross-sectional surface being bisected in the middle with a concave portion at an upper portion of the cross-sectional surface and a convex portion at a lower portion of the cross-sectional surface.

2. A spring provided between a first member and a second member, the spring comprising:

a main body portion having a hole portion;

a first cylindrical portion provided at a radially inner circumference and a second cylindrical portion provided at a radially outer circumference of the main body portion;

a first corner portion formed at a boundary portion between the main body portion and the first cylindrical portion; and a second corner portion formed at a boundary portion between the main body portion and the second cylindrical portion;

wherein the main body portion is extended in a crossing direction with respect to a direction in which the spring is compressed from the first member and the second member, the first and the second cylindrical portions have an abutting portion protruding from each circumference of the main body portion toward one of the first and the second members and abutting thereat, the first and the second corner portions can be elastically deformed while varying angles thereof according to a suppression strength, the first and the second corner portions define tangent lines along the main body portion, and at least one of the tangent lines has a predetermined angle with resect to a straight line between the radially inner circumference and the radially outer circumference of the main body portion, and a cross-sectional surface of the main body portion includes a linear shape, and the cross-sectional surface includes a conical shape at a lower portion of the cross-sectional surface.

* * * * *